United States Patent
Papirakis

(10) Patent No.: US 8,509,067 B2
(45) Date of Patent: *Aug. 13, 2013

(54) SYSTEM AND METHOD FOR CONTROLLING NETWORK CONGESTION

(75) Inventor: Emmanuel Papirakis, Trois-Rivieres (CA)

(73) Assignee: Unwired Planet, Inc., Redwood City, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/171,174

(22) Filed: Jun. 28, 2011

(65) Prior Publication Data

US 2011/0255403 A1   Oct. 20, 2011

Related U.S. Application Data

(63) Continuation of application No. 11/264,901, filed on Nov. 2, 2005, now Pat. No. 7,983,156.

(60) Provisional application No. 60/626,957, filed on Nov. 12, 2004.

(51) Int. Cl.
    *H04J 1/16* (2006.01)
(52) U.S. Cl.
    USPC .......................................... 370/229
(58) Field of Classification Search
    USPC .................................. 370/229–238
    See application file for complete search history.

(56) References Cited

U.S. PATENT DOCUMENTS

| | | | |
|---|---|---|---|
| 6,252,851 B1 | 6/2001 | Siu et al. | 370/236 |
| 6,643,259 B1 | 11/2003 | Borella et al. | 370/231 |
| 6,888,824 B1 | 5/2005 | Fang et al. | 370/359 |
| 6,917,585 B1 | 7/2005 | Firoiu et al. | 370/229 |
| 6,967,921 B1 | 11/2005 | Levy et al. | 370/230.1 |
| 6,990,070 B1 | 1/2006 | Aweya et al. | 370/230 |
| 7,391,736 B2 | 6/2008 | Na et al. | 370/252 |
| 2003/0041158 A1 | 2/2003 | Hejna, Jr. | 709/231 |
| 2003/0189930 A1 | 10/2003 | Terrell et al. | 370/389 |
| 2004/0218617 A1 | 11/2004 | Sagfors | 370/412 |

OTHER PUBLICATIONS

Jacobson, *Congestion Avoidance and Control*, Nov. 1988, Lawrence Berkeley Laboratory, pp. 1-25.
Jain, *Congestion Avoidance in Computer Networks with a Connectionless Network Layer Part I: Concepts, Goals and Methodology*, Sep. 2, 1998, Digital Equipment Corporation, pp. 1-37.
Sinha, *WTCP: A Reliable Transport Protocol for Wireless Wide-Area Networks*, Wireless Networks 1999, pp. 1-16.

*Primary Examiner* — Kwang B Yao
*Assistant Examiner* — Juvena Loo
(74) *Attorney, Agent, or Firm* — Sheppard, Mullin, Richter & Hampton LLP

(57) ABSTRACT

A method for controlling network congestion includes estimating a queue size, entering a first mode of operation if the estimated queue size is below a first threshold, and entering a second mode of operation if the estimated queue size is above a second threshold.

26 Claims, 2 Drawing Sheets

SYSTEM AND METHOD FOR CONTROLLING NETWORK CONGESTION

CROSS-REFERENCE TO RELATED APPLICATIONS

This application is a continuation of U.S. application Ser. No. 11/264,901 filed Nov. 2, 2005 which claims the benefit of U.S. Provisional Application No. 60/626,957, filed Nov. 12, 2004, the disclosures of which are hereby incorporated herein by reference.

TECHNICAL FIELD

The present invention relates to a system and method for controlling the transfer of data over a network and, more specifically, to a system and method for controlling network congestion.

BACKGROUND

Networking is the practice of linking two or more computing devices together. In networking, the communication language used by such computing devices is called a protocol. A protocol is a standard that controls or enables the connection, communication, and data transfer between two computing endpoints. Protocols may be implemented by hardware, software, or a combination of the two. Although certain protocols may work both in wired and wireless environments, wireless networks are typically more prone to problems such as, for network congestion.

Transport layer protocols generally use one of two methods for controlling the rate at which packets are injected into the network. Under the first method, referred to as a "rate-based," the available bit-rate of the network topology is determined and packets are transmitted separated by an appropriate temporal spacing. Under the second method, referred to as "sliding window," the amount of outstanding data needed to keep the network busy at all times is determined, and this amount of data is constantly maintained in transit between the two end points. In the past, algorithms for determining the amount of data needed to keep a network busy have typically used packet-loss as an indication of network congestion.

When congestion-related packet loss occurs (e.g., due to an overflow in a bottleneck queue), the traditional network reaction has been to decrease the congestion window multiplicatively. For example, TCP decreases its congestion window by a factor of ½. This gives the queues an opportunity to drain, while giving competing flows of data a chance to obtain their fair share of the available resources. Unfortunately, in a wireless network, if many packets are lost due to wireless link errors, this approach only allows a fraction of the link's capacity to be effectively used.

Alternative TCP variations have attempted to address the additional problems presented by wireless networks, such as TCP Westwood and the Wireless Transmission Protocol (WTCP). The former is built around TCP's sliding window algorithm, whereas the latter is entirely rate-based. Both alternatives are based upon loss-differentiation algorithms

BRIEF SUMMARY OF THE INVENTION

The present invention relates to a protocol mediator that overcomes several problems associated with transport protocols, including non-congestion-related losses, among many others. Furthermore, the invention may be deployed both in wired and wireless networks. In one embodiment, the present invention operates in sliding window or rate-based mode of operation depending upon network conditions. The decision to switch between these modes of operation may be based upon an estimate of the size of a bottleneck queue. One of the many innovations of the present invention is that it does not rely upon loss differentiation, thereby avoiding the risks associated such algorithms.

When the present invention operates in rate-based mode, a current sending-rate may be determined and the bottleneck capacity may be estimated, for example, by filtering inter-acknowledgement time spacing. The queue size may be estimated by calculating the difference between the current sending rate and the bottleneck sending rate, and multiplying this difference by the shortest round-trip time. When the present invention operates in sliding window mode, the bottleneck capacity may be estimated by dividing the amount of outstanding data by the current round-trip time, and the current sending rate may be estimated by dividing the amount of outstanding data by the smallest round-trip time seen during the communication. Again, the queue size may be estimated by calculating the difference between both values multiplied by the shortest round-trip time.

The present invention maintains an equilibrium in which a small number of packets are kept in the bottleneck queue at all times in order to ensure that the wired or wireless link is fully utilized. If there are no packets in the queue, the present invention preferably enters rate-based mode. When there are enough packets in the queue, the present invention preferably enters sliding window mode. When in rate-based mode, the present invention may initially send packets at a rate that is slightly faster than the bottleneck's processing capacity in order to build the bottleneck's queues and then switch back to sliding window mode when the queues are at a desired level.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
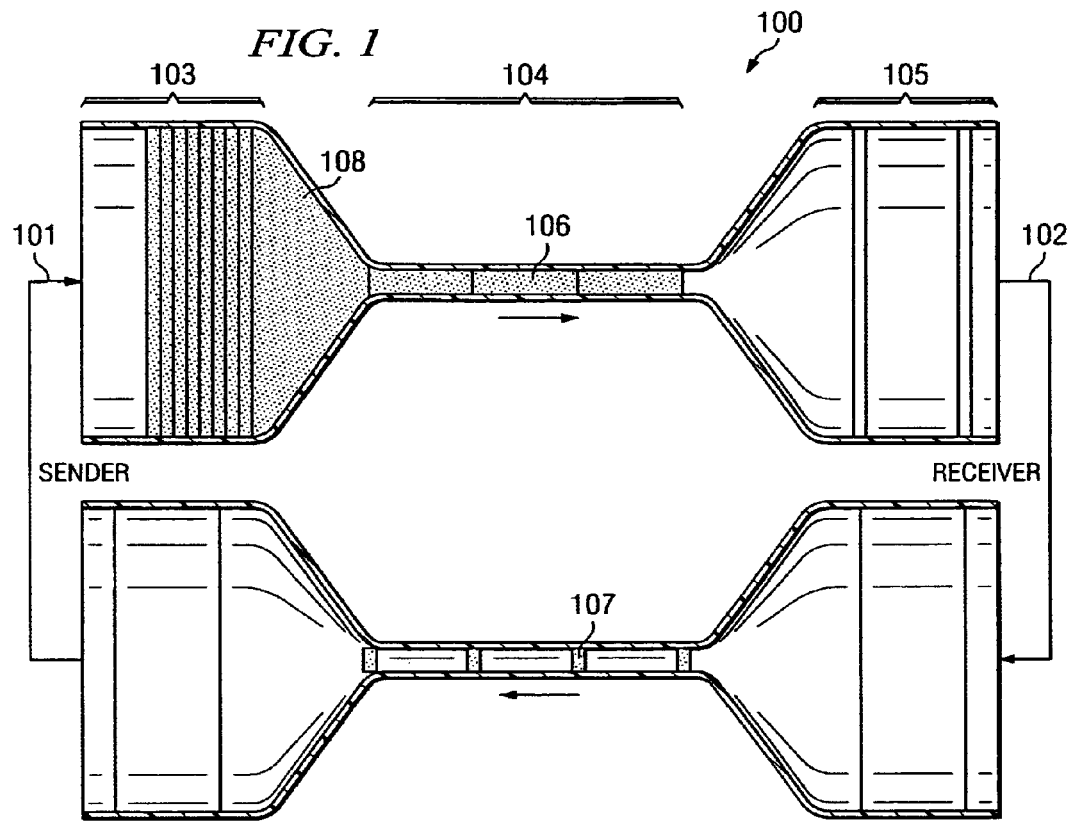
FIG. 1 is a diagram of a network link according to one embodiment of the present invention.

FIG. 1 is a diagram of a network link 100 according to an exemplary embodiment of the invention. Sender 101 and receiver 102 exchange data over their respective high-bandwidth networks 103 and 105, and through long-haul link 104. Sender 101 transmits data packets 106 to receiver 102, and receiver 102 sends acknowledgement packets 107 back to sender 101. Because long-haul link 104 has less bandwidth than high-bandwidth network 103, packets are queued at bottleneck 108 before being transmitted.

Sender 101 and receiver 102 may be standard computers, servers, laptops, personal digital assistants (PDAs), mobile phones, or any other entities that are operable to connect via networks link 100. Network link may be established over wired networks such as, for example, local area networks (LAN) and wide area networks (WAN), or over wireless networks such as, for example, IEEE 802.11b (WiFi), General Packet Radio Service (GPRS), Universal Mobile Telecommunications Service (UMTS), Personal Communications Service (PCS), Global System for Mobile communications (GSM), Digital-Advanced Mobile Phone Service (DAMPS), Interim Standard (IS)-136, IS-95, Code Division Multiple Access (CDMA) 2000, Wide-band CDMA (W-CDMA), or Universal Mobile Telecommunications Service (UMTS) standards, or any other Personal Communications Services (PCS), Time Division Multiple Access (TDMA) or CDMA wireless network.

The term "network" as used herein refers generally to typical infrastructure and components of a telecommunications network, such as base stations, mobile switching centers, switching and control networks, and any other related gateways, nodes or elements, including Home Location Registers (HLRs), Visitor Location Registers (VLRs), Signaling Control Points, message centers, and the like. Network link 100 may also be established, for example, over the Internet.

Furthermore, any type of transport protocol may be used in the communication between sender 101 and receiver 102 including, for example, Transmission Control Protocol (TCP), User Datagram Protocol (UDP), Stream Control Transmission Protocol (SCTP). In one embodiment, the present invention provides a system and method for controlling and/or reducing congestion over network link 100.

Figure 2:
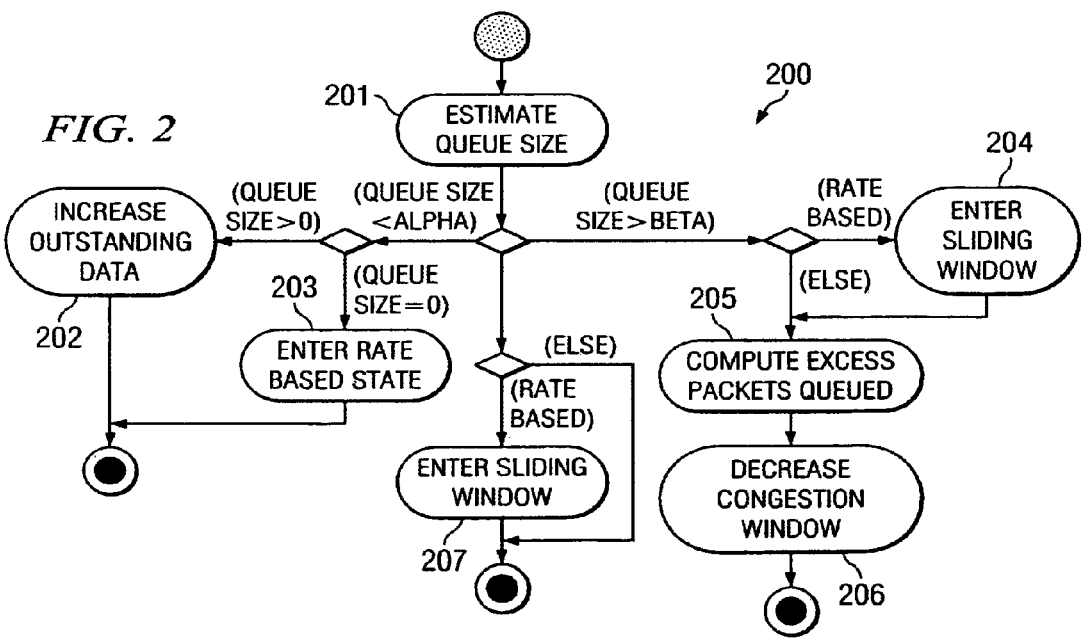
FIG. 2 is a flowchart for controlling congestion in a network according to one embodiment the present invention.

FIG. 2 is flowchart 200 for controlling congestion in a network according to an exemplary embodiment of the invention. In one embodiment, algorithm 200 may assume that all or most packet losses are related to congestion and may multiplicatively decrease a sending rate when a loss occurs. Algorithm 200 may also use, for example, a delay-based congestion control algorithm and proactively reduce a transmission rate before packets are actually lost.

In step 201, a queue size or length is estimated. The queue size may be estimated, for example, by taking round-trip time measurements. A packet may be delegated and the packet's sequence number associated with the connection or link may be stored. A time difference between the instant that the packet is sent and the instant it is acknowledged may be measured. An increase in the round-trip time indicates network congestion and is referred to as the "price" of the instantaneous congestion. With knowledge of the round-trip time over the network when no packets are queued, algorithm 200 may compute the price ratio of the instantaneous congestion level. For instance, if the ratio of a current round-trip time to the round-trip time when no packets are queued is 1.25, the price of the current round-trip time is 25% too high. The price or round-trip time of an idle network link may be configurable. Alternatively, the smallest round-trip time observed during the lifetime of a connection may be used as an estimation of this price.

In one embodiment, R is the current round-trip time of the network, R' is the smallest round-trip time observed during the lifetime of a connection, and F is the instantaneous flight size, such that R'/R is smaller or equal to 1. The term "flight size" as used herein refers to the amount of data in transit at a specific point in time. Algorithm 200 may maintain this ratio at a value slightly smaller than 1, thereby guaranteeing that the network utilization is maximized. In this embodiment, the price factor of the network's current level of congestion is (1−R'/R). When multiplied by the current flight size F(1−R'/R), the result is the amount of excess data currently in transit. For instance, if the number of excess outstanding bytes is zero, algorithm 200 may increase the amount of outstanding data by just a few packets. On the other hand, if the number of excess outstanding bytes is very high, it indicates congestion and algorithm 200 may decrease the amount of outstanding data to allow the queues to drain.

When algorithm 200 is applied to a byte-oriented protocol (as opposed to a packet-oriented protocol such as a Wireless Transaction Protocol or WTP, for instance), the queue estimator F(1−/V/R) yields the number of bytes currently queued. However, in order to obtain the number of packets queued, estimator F(1−R'/R) may be divided by the average number of bytes that a packet contains. In the TCP protocol, for example, this value is commonly known as the maximum segment size ("mss"). Using simple arithmetic, the queue size estimator described above becomes:

$$\text{Queue Size Estimator} = \frac{(FR - FR')}{Rmss}$$

When a network connection is in steady state, algorithm 200 may be used to compute the queue size estimator once per round-trip time. Algorithm 200 may also utilize two thresholds, where the first threshold ("alpha") is a minimum acceptable queue size and the where the second threshold ("beta") is a maximum acceptable queue size.

In one embodiment, when the queue size estimator is below alpha and the queue size is greater than zero, algorithm 200 may increase the instantaneous amount of outstanding data by mss bytes in step 202. If the queue size is zero, algorithm 200 enters a rate-based state or operation in step 203. Alternatively, if the system is not configured to use a rate-based state, algorithm 200 may initiate a slow-start mode (also referred to as a sliding window operation with exponential congestion window growth), for example, by setting a slow start threshold ("ssthresh") to an arbitrarily large value. Note that the slow start threshold is unrelated to alpha or beta. The algorithm shown in FIG. 200 may be used to correct a bias in a TCP congestion control scheme. This congestion control scheme, when in steady state, uses two variables. One variable is the congestion window and the other is the slow start threshold. The idea is to ensure that the flight size is always the smallest amount between the congestion window ("cwnd") and the window advertised by the receiving end ("awnd"). In the TCP congestion control scheme, the congestion window grows exponentially when it is less than the slow start threshold, and it grows linearly otherwise. On some networks, when a large quantity of resources is available, the rate-based mode is not practical. In those circumstances, an exponential growth of the congestion window may replace the rate-based mode with by setting the slow start threshold to an arbitrarily high value.

On the other hand, if the queue size is greater than beta while operating in rate-based mode, algorithm 200 enters a sliding window state in step 204. After step 204, I the mode is not rate-based, algorithm 200 computes the number of excess data packets queued at the bottleneck in step 205 and, in step 206, decreases the congestion window proportionally to the excess number of data packets. Algorithm 200 decreases the congestion window by at least one packet. However, because the goal is to decrease the congestion window multiplicatively, the congestion window may be decreased by a fraction of the number of excess data packets queued. In another embodiment, the congestion window may be decreased by a factor of ⅞ the excess data packets queued. Finally, if the queue size is between alpha and beta while operating in rate-based mode, algorithm 200 may enter the sliding window state in step 207.

Figure 3:
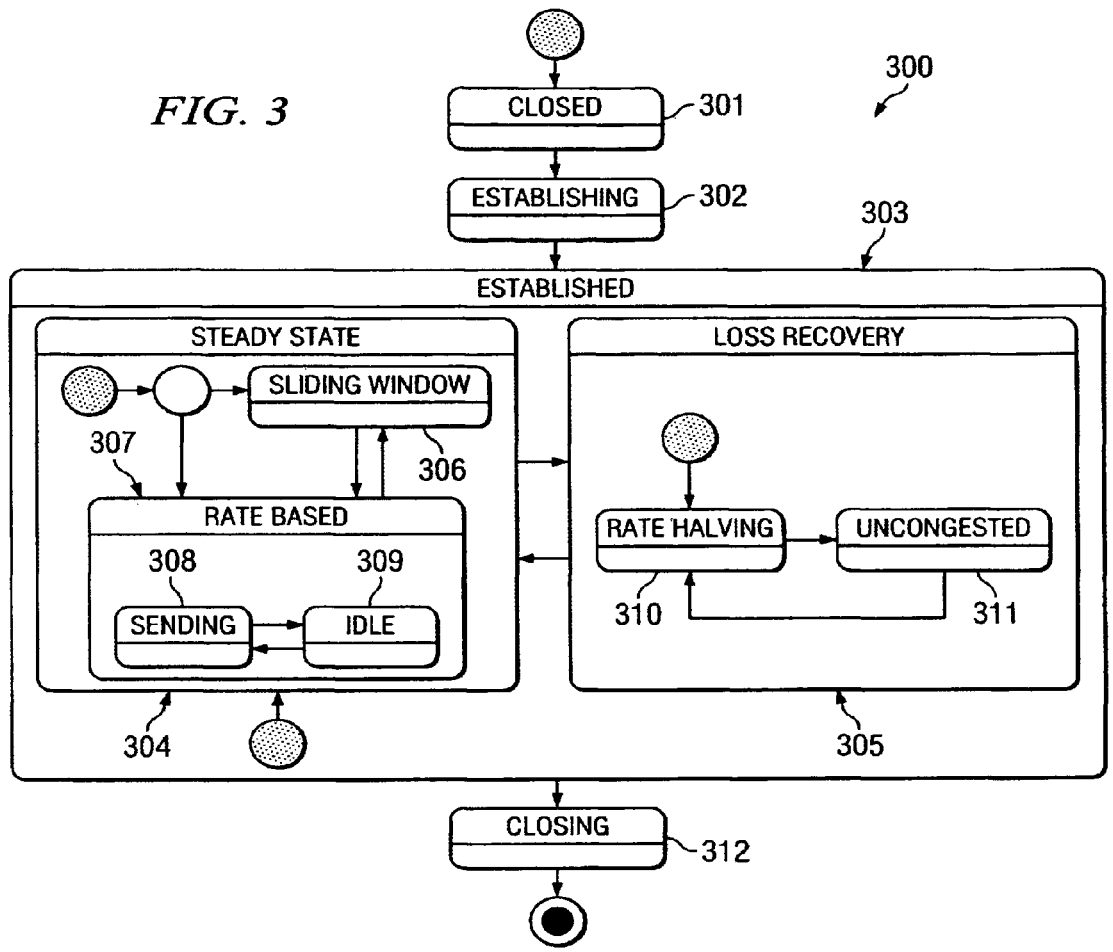
FIG. 3 is a state diagram of a TCP mediator according to one embodiment of the present invention.

FIG. 3 is state diagram 300 of a TCP mediator according to an exemplary embodiment of the invention. State 301 is a closed state, in which there is no network connection. Upon receipt of a connection establishment request, a connection establishment takes place in state 302. In one exemplary embodiment, the invention may be implemented within TCP and state 302 may involve the standard 3-way handshake. Sub-states within state 302 are well known in the art and need not be described in further detail. In state 303, network connection is established.

State 303 includes steady state 304 and loss recovery state 305. In state 304, the connection is stable and data sent by sender 101 is properly received by receiver 102. In this state, sender 101 receives acknowledgement packets from the receiver 102. Each acknowledgement packet preferably contains an acknowledgement sequence number, which increases with each received packet. In state 304, it is assumed that the first sign of congestion is an increase in round-trip time, and algorithm 200 described in FIG. 2 may be employed in order to control and/or reduce network congestion. In addition, an estimator of inter-acknowledgement temporal spacing may be maintained using a weighted history. State 304 includes sliding window state 306 and rate-based state 307.

In sliding window state 306, sliding window algorithms known in the art may be used to inject new data only when a packet leaves the network, the detection of which may be performed by monitoring the receipt of acknowledgement packets. Furthermore, algorithm 200 described in FIG. 2 may be used in order to switch operation between sliding window state 306 and rate-based state 307.

In one embodiment, a timer may be set in rate-based state 307 to a value equal to ⅞ of the inter-acknowledgement spacing. When this timer expires, a new packet (or a burst of packets) may be injected into the network, thereby increasing the sending rate by 1.14 times each round-trip time. Thus, in this exemplary embodiment, when in rate-based operation, a small amount of congestion is forced which maintains the size of the queues in the range between alpha and beta according to algorithm 200 depicted in FIG. 2. In the next roundtrip time, the queue size may be greater than alpha. Thus, a slight level of congestion is created and causes the return to sliding window state 306.

If a data packet is lost while in rate-based state 307, sliding window state 306 is entered into and a congestion window may be set proportionally to the amount of outstanding data. In one embodiment, the congestion window may be multiplied by a factor of about ⅞ so that, if packet loss is due to corruption, the penalty is relatively mild. The use of a ⅞ multiplicative factor allows queues to drain quickly over a few round-trip times. In another embodiment, alpha and beta may be selected based upon the network's characteristics so that the congestion window is decreased to the network capacity. After returning to steady state 304, queue estimator may indicate the level of congestion, and the congestion window may be exponentially decreased after each round-trip time.

In loss recovery state 305, a rate halving state 310 may be implemented so that for every other packet that leaves the network, data is injected into it once again. Accordingly, every other packet that leaves the network decreases the length of the queues by one packet. In one exemplary embodiment, uncongested state 311 is reached when the amount of outstanding data is about ⅞ of the amount of data that was outstanding at the time the lost packet was detected.

Program or code segments making up various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 4:
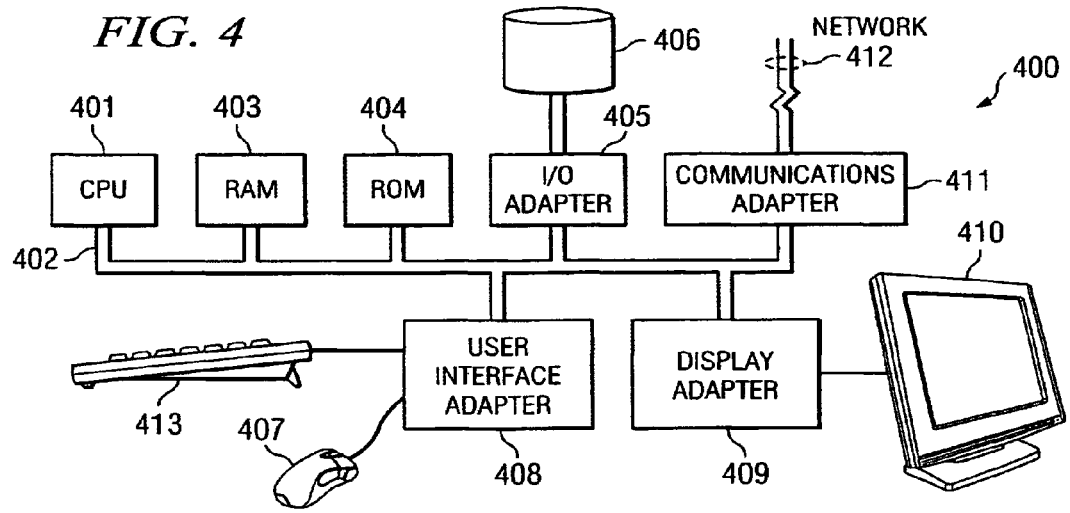
FIG. 4 is a block diagram of a computer system according to one embodiment the present invention.

FIG. 4 illustrates computer system 400 adapted to use certain embodiments of the present invention including, for example, storing and/or executing software associated with the embodiments. Central processing unit (CPU) 401 is coupled to system bus 402. CPU 401 may be any general purpose CPU. However, embodiments of the present invention are not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. I/O adapter card 405 connects storage devices 406, such as one or more of a hard drive, a CD drive, a floppy disk drive, a tape drive, to computer system 400. I/O adapter 405 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 411 is adapted to couple the computer system 400 to network 412, which may be one or more of a telephone network, a local (LAN) and/or a wide-area (WAN) network, an Ethernet network, and/or the Internet network. User interface card 408 couples user input devices, such as keyboard 413, pointing device 407, and the like, to computer system 400. Display card 409 is driven by CPU 401 to control the display on display device 410.

The transport protocol mediator of the present invention may be implemented, for example, within the network adapter 411 and its device driver. Alternatively, the transport protocol mediator of the present invention may be implemented entirely in hardware, or entirely as a software package.

In an open source environment, the invention may be practiced by modifying the source code of a TCP (or SCTP) implementation (e.g., Linux or BSD) and recompiling the kernel. On the other hand, closed operating systems typically offer an application program interface (API) that permits inserting and removing networking code from their TCP/IP stack in the form of "filters" or "streams". In this case, TCP (or SCTP) packets can be intercepted and traffic can be manipulated. These implementation mechanisms work at the operating system's kernel level. However, it is also possible to "redirect" traffic from the kernel space to non-kernel space, and handle the traffic from that level (for example, by providing a character device like interface to a program that can implement the invention). Finally, in the case of UDP traffic, the invention may be implemented in non-kernel space. In a preferred embodiment, the invention is bundled in a dynamic link library (DLL), whereby a given protocol can be linked to the DLL and use a well-defined API.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for controlling congestion over a network link between a source node and a destination node, comprising:
at a computer having one or more processors and memory:
estimating a queue size for the source node, wherein the queue size is a function of at least a current round-trip time between the source node and the destination node, a configurable round-trip time between the source node and the destination node, and an estimated amount of data in transit over the network link;
comparing the estimated queue size with at least one of a predefined minimum threshold and a predefined maximum threshold;
if the estimated queue size is less than the predefined minimum threshold, causing an increase of a rate at which data packets are injected into the network link at the source node; and
if the estimated queue size is greater than the predefined maximum threshold, causing a decrease of the rate at which data packets are injected into the network link at the source node.

2. The computer-implemented method of claim 1, wherein estimating a queue size for the source node further includes:
measuring the current round-trip time between the source node and the destination node;
determining a current congestion level over the network link based upon the current round-trip time between the source node and the destination node and the configurable round-trip time between the source node and the destination node;
determining a number of bytes to be queued based upon the current congestion level and the estimated amount of data in transit over the network link; and
using the number of bytes to be queued and a predefined maximum segment size to estimate the queue size for the source node.

3. The computer-implemented method of claim 2, wherein estimating the queue size for the source node further includes measuring a time difference between when a packet is injected onto the network link at the source node and when an acknowledgement of its receipt by the destination node is received by the source node.

4. The computer-implemented method of claim 2, wherein the configurable round-trip time between the source node and the destination node is a round-trip time over the network link between the source node and the destination node when no data packet is queued at the source node.

5. The computer-implemented method of claim 1, wherein, if the estimated queue size is zero, the rate at which data packets are injected into the network link at the source node is increased in accordance with a rate-based method.

6. The computer-implemented method of claim 5, wherein the rate-based method further includes increasing an amount of data packets to be transmitted over the network link based on an available bit rate.

7. The computer-implemented method of claim 1, wherein, if the estimated queue size is greater than zero and less than the predefined minimum threshold, the rate at which data packets are injected into the network link at the source node is increased in accordance with a sliding window method with exponential congestion window growth.

8. The computer-implemented method of claim 1 further comprising: causing the source node to switch from a rate-based method to a sliding window method with exponential congestion window growth if data packets are injected into the network link at the source node in accordance with the rate-based method while the estimated queue size is greater than the predefined minimum threshold and less than the predefined maximum threshold.

9. The computer-implemented method of claim 1, wherein, if the estimated queue size is greater than the predefined maximum threshold, the rate at which data packets are injected into the network link at the source node is decreased in accordance with a sliding window method with linear congestion window growth.

10. The computer-implemented method of claim 9, wherein the sliding window method with linear congestion window growth further includes:
determining a number of excess data packets queued at the source node; and
decreasing a congestion window proportionally to the number of excess data packets queued.

11. The computer-implemented method of claim 10, wherein decreasing the congestion window further includes decreasing the congestion window by a fraction of the number of excess data packets queued.

12. The computer-implemented method of claim 1, wherein the network link includes at least one wireless link.

13. A computer system for controlling congestion over a network link between a source node and a destination node, comprising:
one or more processors and memory; and one or more programs stored in the memory, wherein the one or more programs, when executed by the one or more processors, cause the one or more processor to:
  estimate a queue size for the source node, wherein the queue size is a function of at least a current round-trip time between the source node and the destination node, a configurable round-trip time between the source node and the destination node, and an estimated amount of data in transit over the network link;
  compare the estimated queue size with at least one of a predefined minimum threshold and a predefined maximum threshold;
  if the estimated queue size is less than the predefined minimum threshold, cause an increase of a rate at which data packets are injected into the network link at the source node; and
  if the estimated queue size is greater than the predefined maximum threshold, cause a decrease of the rate at which data packets are injected into the network link at the source node.

14. The computer system of claim 13, wherein the one or more programs for estimating a queue size for the source node further include one or more programs for:
  measuring the current round-trip time between the source node and the destination node;
  determining a current congestion level over the network link based upon the current round-trip time between the source node and the destination node and the configurable round-trip time between the source node and the destination node;
  determining a number of bytes to be queued based upon the current congestion level and the estimated amount of data in transit over the network link; and
  using the number of bytes to be queued and a predefined maximum segment size to estimate the queue size for the source node.

15. The computer system of claim 14, wherein the one or more programs for estimating the queue size for the source node further include one or more programs for measuring a time difference between when a packet is injected onto the network link at the source node and when an acknowledgement of its receipt by the destination node is received by the source node.

16. The computer system of claim 14, wherein the configurable round-trip time between the source node and the destination node is a round-trip time over the network link between the source node and the destination node when no data packet is queued at the source node.

17. The computer system of claim 13, wherein, if the estimated queue size is zero, the rate at which data packets are injected into the network link at the source node is increased in accordance with a rate-based method.

18. The computer system of claim 13, wherein, if the estimated queue size is greater than zero and less than the predefined minimum threshold, the rate at which data packets are injected into the network link at the source node is increased in accordance with a sliding window method with exponential congestion window growth.

19. The computer system of claim 13, further comprising one or more programs for: causing the source node to switch from a rate-based method to a sliding window method with exponential congestion window growth if data packets are injected into the network link at the source node in accordance with the rate-based method while the estimated queue size is greater than the predefined minimum threshold and less than the predefined maximum threshold.

20. The computer system of claim 13, wherein, if the estimated queue size is greater than the predefined maximum threshold, the rate at which data packets are injected into the network link at the source node is decreased in accordance with a sliding window method with linear congestion window growth.

21. The computer system of claim 13, wherein the network link includes at least one wireless link.

22. A non-transitory computer readable medium having one or more programs recorded thereon for causing one or more computers to control congestion over a network link between a source node and a destination node, the one or more programs including steps, the steps comprising:
  estimating a queue size for the source node, wherein the queue size is a function of at least a current round-trip time between the source node and the destination node, a configurable round-trip time between the source node and the destination node, and an estimated amount of data in transit over the network link;
  comparing the estimated queue size with at least one of a predefined minimum threshold and a predefined maximum threshold;
  if the estimated queue size is less than the predefined minimum threshold, causing an increase of a rate at which data packets are injected into the network link at the source node; and
  if the estimated queue size is greater than the predefined maximum threshold, causing a decrease of the rate at which data packets are injected into the network link at the source node.

23. The computer readable medium of claim 22, wherein the one or more programs for estimating a queue size for the source node further include one or more programs for:
  measuring the current round-trip time between the source node and the destination node;
  determining a current congestion level over the network link based upon the current round-trip time between the source node and the destination node and the configurable round-trip time between the source node and the destination node;
  determining a number of bytes to be queued based upon the current congestion level and the estimated amount of data in transit over the network link; and
  using the number of bytes to be queued and a predefined maximum segment size to estimate the queue size for the source node.

24. The computer readable medium of claim 23, wherein the one or more programs for estimating the queue size for the source node further include one or more programs for measuring a time difference between when a packet is injected onto the network link at the source node and when an acknowledgement of its receipt by the destination node is received by the source node.

25. The computer readable medium of claim 22, further comprising one or more programs for: causing the source node to switch from a rate-based method to a sliding window method with exponential congestion window growth if data packets are injected into the network link at the source node in accordance with the rate-based method while the estimated queue size is greater than the predefined minimum threshold and less than the predefined maximum threshold.

26. The computer readable medium of claim 22, wherein, if the estimated queue size is greater than the predefined maximum threshold, the rate at which data packets are injected into the network link at the source node is decreased in accordance with a sliding window method with linear congestion window growth.

\* \* \* \* \*

UNITED STATES PATENT AND TRADEMARK OFFICE
CERTIFICATE OF CORRECTION

| | | |
|---|---|---|
| PATENT NO. | : 8,509,067 B2 | Page 1 of 1 |
| APPLICATION NO. | : 13/171174 | |
| DATED | : August 13, 2013 | |
| INVENTOR(S) | : Emmanuel Papirakis | |

It is certified that error appears in the above-identified patent and that said Letters Patent is hereby corrected as shown below:

In the Claims

Claim 1 column 7, lines 46-47:
"at a computer having one or more processors and memory:
   estimating a queue size"

should read
-- at a computer having one or more processors and memory, estimating a queue size --

Signed and Sealed this
Thirty-first Day of December, 2013

Margaret A. Focarino
*Commissioner for Patents of the United States Patent and Trademark Office*